US012440112B2

(12) United States Patent
Barnacka et al.

(10) Patent No.: US 12,440,112 B2
(45) Date of Patent: Oct. 14, 2025

(54) SYSTEM AND METHOD FOR LEAK CORRECTION AND NORMALIZATION OF IN-EAR PRESSURE MEASUREMENT FOR HEMODYNAMIC MONITORING

(71) Applicants: Anna Barnacka, Cambridge, MA (US); Jal Panchal, Everett, MA (US); Martin D. Ring, Ashland, MA (US); Pratistha Shakya, Auburn, MA (US)

(72) Inventors: Anna Barnacka, Cambridge, MA (US); Jal Panchal, Everett, MA (US); Martin D. Ring, Ashland, MA (US); Pratistha Shakya, Auburn, MA (US)

(73) Assignee: MINDMICS, INC, Cambridge, MA (US)

( * ) Notice: Subject to any disclaimer, the term of this patent is extended or adjusted under 35 U.S.C. 154(b) by 446 days.

(21) Appl. No.: 17/359,001

(22) Filed: Jun. 25, 2021

(65) Prior Publication Data

US 2021/0401311 A1 Dec. 30, 2021

Related U.S. Application Data

(60) Provisional application No. 63/044,056, filed on Jun. 25, 2020.

(51) Int. Cl.
*A61B 5/021* (2006.01)
*A61B 5/00* (2006.01)
*H04R 1/10* (2006.01)

(52) U.S. Cl.
CPC ........ *A61B 5/02116* (2013.01); *A61B 5/6817* (2013.01); *A61B 5/7203* (2013.01); *H04R 1/1016* (2013.01); *A61B 2562/0204* (2013.01)

(58) Field of Classification Search
CPC . A61B 5/02116; A61B 5/6817; A61B 5/7203; A61B 2562/0204; H04R 1/1016
(Continued)

(56) References Cited

U.S. PATENT DOCUMENTS 10,506,310 B2 * 12/2019 Aumer ................ A61B 5/6802
10,646,121 B2   5/2020 Narasimhan et al.
(Continued)

FOREIGN PATENT DOCUMENTS

WO PCT/US2021/039173   10/2021

OTHER PUBLICATIONS

International Search Report, mailed on Oct. 13, 2021, from related International application PCT/US2021/039173, filed on Oct. 13, 2021. Two (2) pages.
(Continued)

*Primary Examiner* — Alex M Valvis
*Assistant Examiner* — Chanel J Jhin
(74) *Attorney, Agent, or Firm* — Gillis Patent Law, LLC

(57) ABSTRACT

A system and method for leak correction and normalization of in-ear pressure measurement for hemodynamic monitoring are disclosed. The system includes an acoustical assembly and a data analysis system. The acoustical assembly includes an earbud system that forms an earbud seal with an ear canal of an individual, where the earbud system includes an earbud with an in-ear acoustic sensor that detects acoustic signals in the ear canal. The acoustic signals include audible signals and infrasonic signals. The data analysis system receives the acoustic signals from the earbud system, identifies hemodynamic pressure signals from a body of the individual included within the infrasonic signals, and identifies signal characteristics of the pressure signals over time. The data analysis system can then correct the hemodynamic pressure signals for effects caused by leaks in the earbud seal based upon changes to the signal characteristics over time.

15 Claims, 12 Drawing Sheets

(58) Field of Classification Search
USPC .......................................................... 600/485
See application file for complete search history.

(56) References Cited

U.S. PATENT DOCUMENTS

| | | | |
|---|---|---|---|
| 10,772,512 B2 | 9/2020 | Klaassen et al. | |
| 2010/0280396 A1* | 11/2010 | Zhang ................. | A61B 5/02116 600/485 |
| 2011/0125063 A1* | 5/2011 | Shalon ................. | A61B 5/4205 600/590 |
| 2016/0051150 A1* | 2/2016 | Aarts ................... | A61B 5/7275 600/485 |
| 2016/0212530 A1 | 7/2016 | Liu et al. | |
| 2019/0247010 A1 | 8/2019 | Barnacka | |
| 2019/0348041 A1 | 11/2019 | Cella et al. | |
| 2021/0015442 A1 | 1/2021 | Barnacka et al. | |
| 2021/0045647 A1 | 2/2021 | Barnacka et al. | |
| 2021/0051389 A1 | 2/2021 | Barnacka et al. | |
| 2021/0186350 A1* | 6/2021 | Lesso ................... | H04R 1/1041 |

OTHER PUBLICATIONS

Written Opinion, mailed on Oct. 13, 2021, from related International application PCT/US2021/039173, filed on Oct. 13, 2021. Five (5) pages.

* cited by examiner

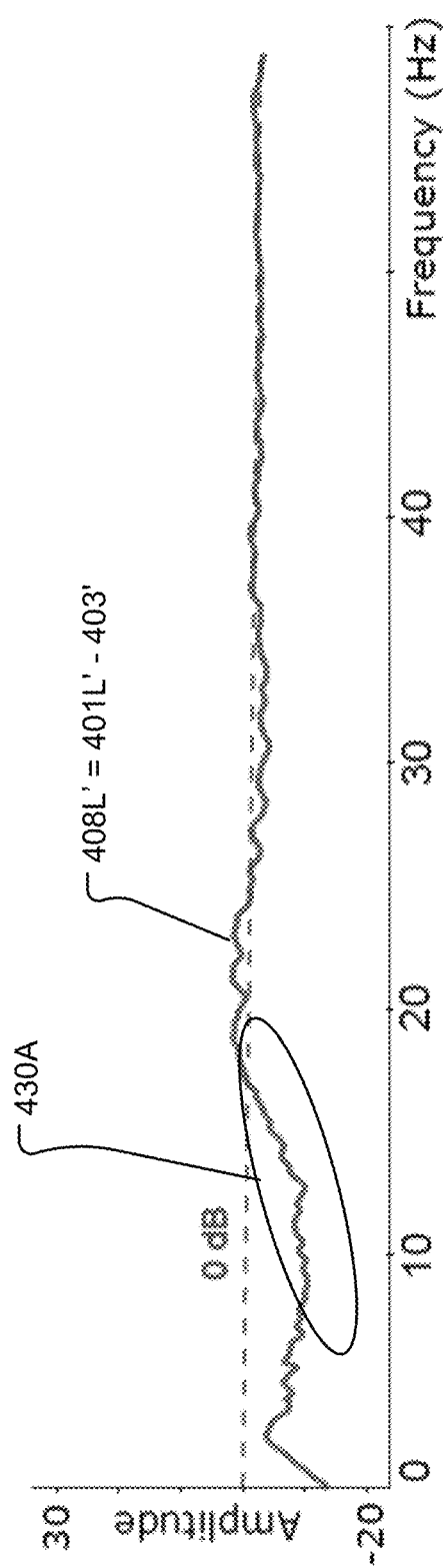
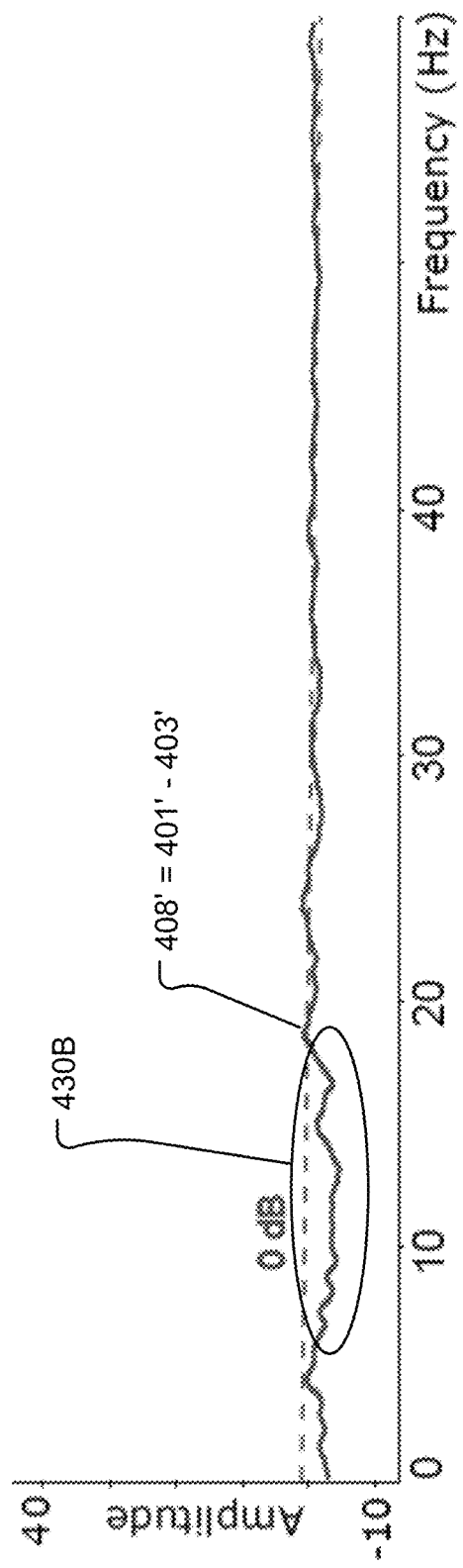
Fig. 4D
Fig. 4E

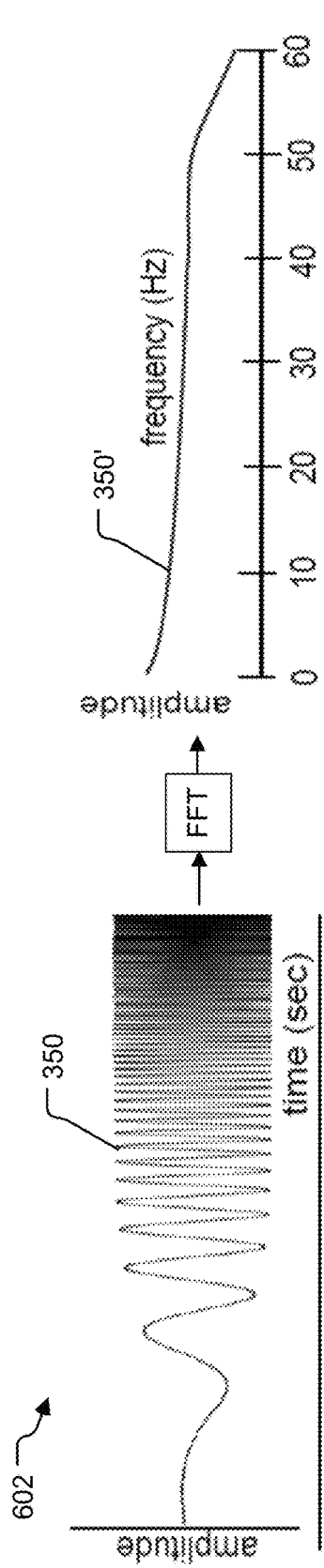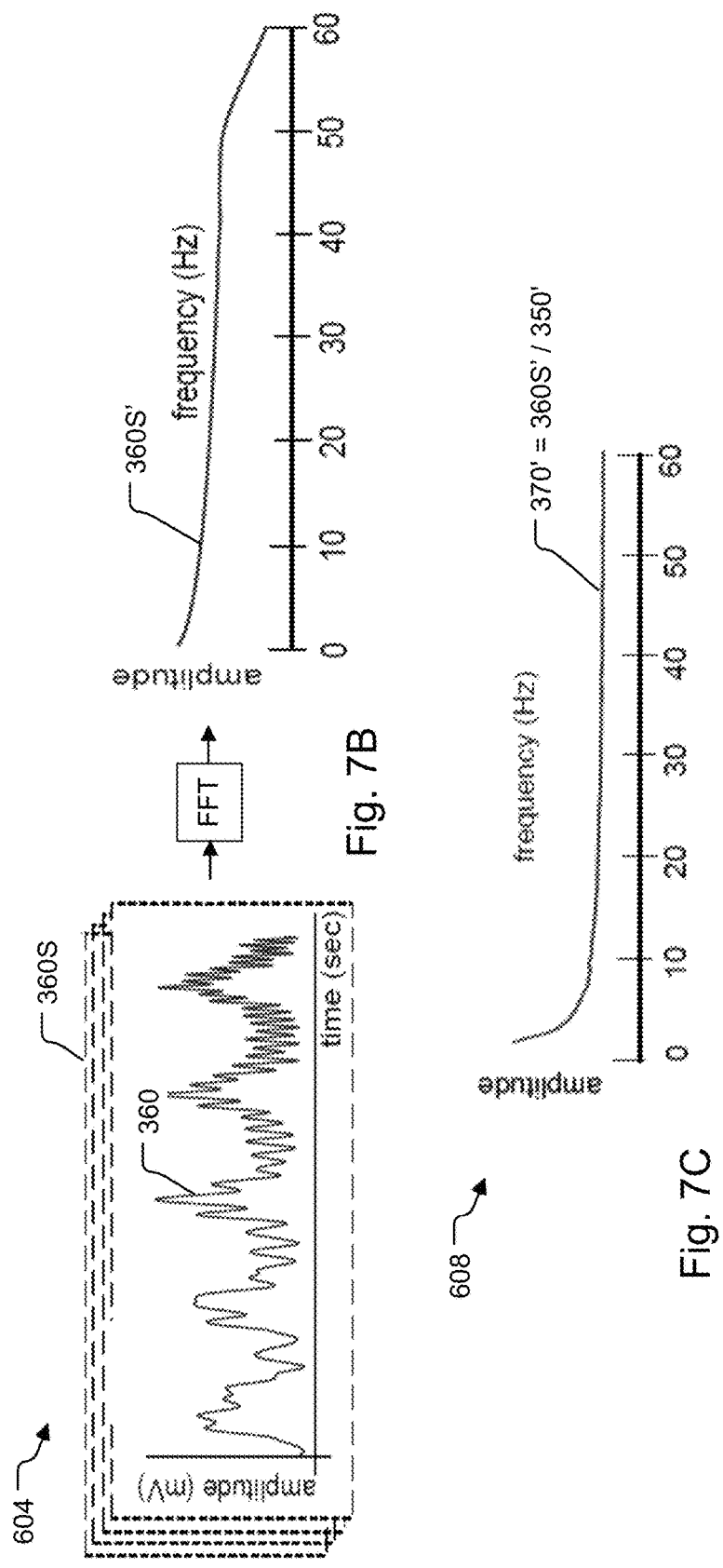
Fig. 7A
Fig. 7B
Fig. 7C

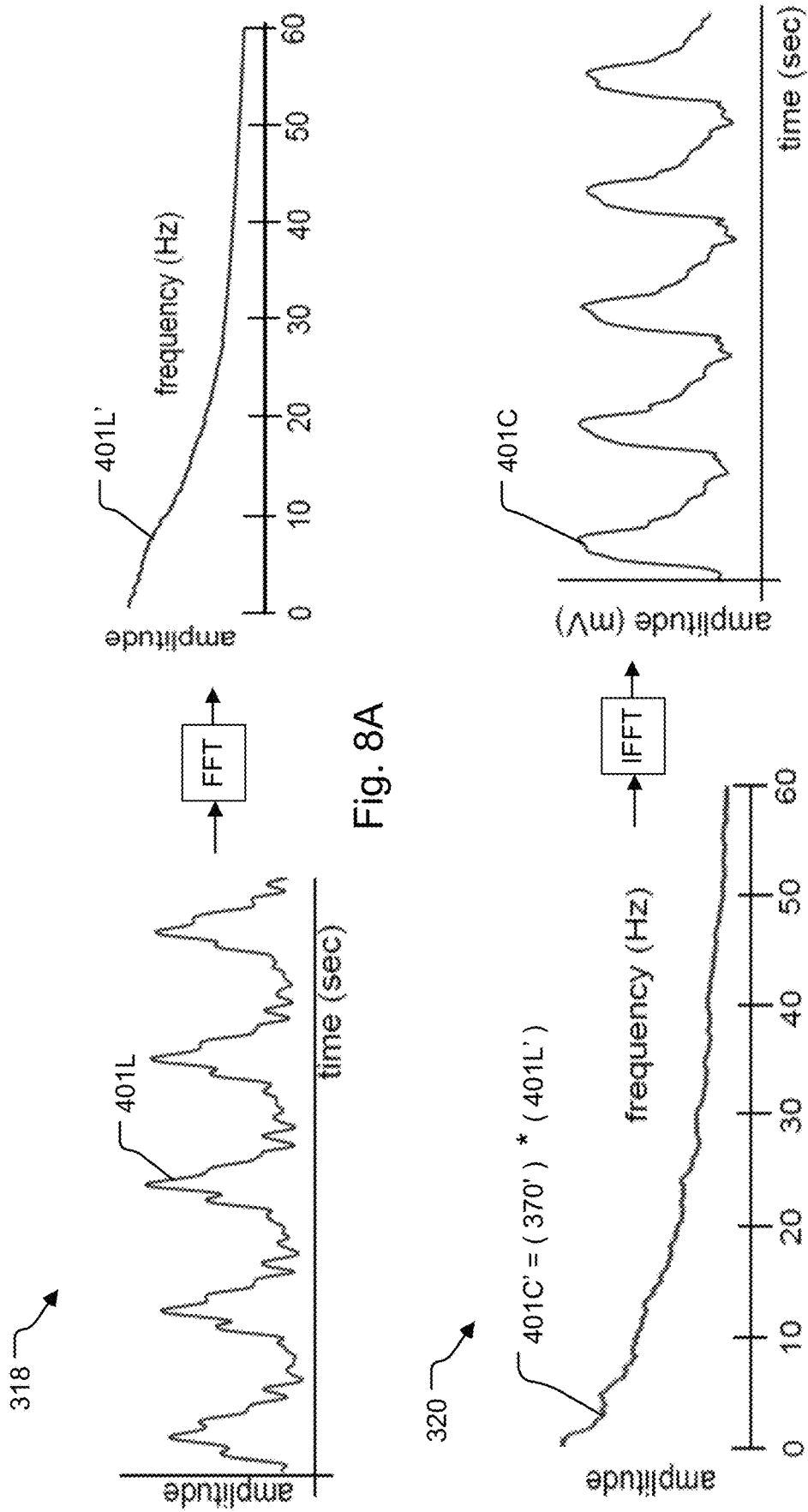

SYSTEM AND METHOD FOR LEAK CORRECTION AND NORMALIZATION OF IN-EAR PRESSURE MEASUREMENT FOR HEMODYNAMIC MONITORING

RELATED APPLICATIONS

This application claims the benefit under 35 USC 119(e) of previously filed U.S. Provisional Application No. 63/044,056 filed on Jun. 25, 2020, which is incorporated herein by reference in its entirety.

BACKGROUND OF THE INVENTION

The cardiovascular system of an individual generally includes the individual's heart and blood vessels. The blood vessels include arteries, capillaries and veins. The cardiovascular system delivers nutrients and oxygen to all cells in the body of the individual.

The heart circulates blood throughout the individual's body via the blood vessels. For this purpose, the heart operates in a repeating cycle. This heart cycle has an active period during which the heart "beats" (i.e. when muscle fibers of the heart contract), known as the systole, followed by a rest period when the muscle fibers relax, known as the diastole.

When the individual is at rest, the heart beats at an average rate also known as the resting heart rate. In general, this resting heart rate, or pulse, is within the range of 60 to 100 heartbeats per minute (BPM). A resting heart rate that is either lower or higher than average can indicate problems with the heart and/or the overall cardiovascular system.

The principles associated with and measurement of the flow of blood in the human body is termed hemodynamics. Typically, hemodynamic measurements are based on invasive monitoring of blood pressures (systemic, pulmonary arterial and venous pressures) and of cardiac output (heart rate and stroke volume). Examples of hemodynamic measurements include stroke volume, blood flow, cardiovascular activity/cardiac function, and blood pressure.

Blood pressure (bp) refers to the force that the blood exerts on the interior walls of the individual's arteries and veins during each heart cycle. It is generally measured in units of mmHg and includes two measurements: systolic and diastolic bp. As these names suggest, the systolic bp is the maximum pressure when the heart is actively beating (systole), while the diastolic bp is the minimum pressure when the heart is resting between beats (diastole). It is usually expressed in terms of the systolic bp "over" the diastolic bp.

Biosignals are signals in living beings such as individuals that can be detected, observed and/or measured. The biosignals are produced continuously over time. Examples of biosignals from individuals include acoustic signals, pressure signals, thermal signals and electrical signals, to name a few.

The acoustic signals, in particular, are created as a result of breathing and physical/mechanical operations within the individual's body. These operations include blood flow throughout the cardiovascular system, and opening and closing of valves within the heart and the blood vessels, in examples. These acoustic signals can be in either the infrasonic range, the audible range or in both ranges. The acoustic biosignals in the infrasonic range are most associated with hemodynamics.

Health care professionals use traditional bp monitoring systems to accurately obtain bp measurements of individuals. These systems include a sphygmomanometer and/or a catheter system. The sphygmomanometer is a non-intrusive device that includes a pressure-inflating device (e.g., manual inflation bulb or battery powered pump), a bp cuff with an inflatable bladder and a monitor with a display. The bp cuff is typically worn around the individual's upper arm to detect the instantaneous bp of the individual via their brachial artery. In contrast, the catheter system provides a continuous bp measurement using a catheter connected to a monitor with a display. The catheter system is intrusive because it requires insertion of a catheter into an artery of the individual such as the brachial artery to measure the bp.

An individual's bp is usually measured when at rest. A normal resting bp measurement consists of a systolic bp in the range of 90-120 mmHg and diastolic bp that is in the range of 60-80 mmHg. In particular, a systolic bp of 120 mmHg and diastolic bp of 80 mmHg, often referred to "120 over 80," is considered to be the optimal average bp measurement for healthy adult individuals.

An individual's resting bp measurements are an important indicator of cardiovascular health (and thus overall health) of an individual. When the resting bp measurements are considered to be unhealthy/outside the normal ranges, this is often an indicator of various health problems including cardiovascular disease and diabetes. In particular, if the bp measurements are consistently higher than their normal ranges, this is known as hypertension. Hypertension is usually associated with resting systolic bp that is consistently above 140 mmHg and resting diastolic bp that is consistently above 90 mmHg.

More recently, wearable bp monitoring systems have been proposed. A first system includes an Apple Watch 5 device from Apple, Inc. that operates in conjunction with a separate bp cuff. The bp cuff obtains the bp measurements and sends the measurements via a wireless link for presentation at a display of the watch. A second system by Apple, Inc. discloses a wrist worn device that allegedly eliminates the need of the separate bp cuff to obtain the bp measurements. See U.S. patent Ser. No. 10/646,121B2. These wearable health monitoring systems have mostly focused on obtaining blood pressure measurements as an indicator of hemodynamics.

The second proposed system discloses capacitive tactile sensors located in a wristband of the wrist worn device. The sensors are arranged against the individual's skin. The system claims that the sensors use applanation tonometry to obtain the bp measurements of an individual via an adjacent artery, such as the radial artery. The bp measurements are then presented on a display of the device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

SUMMARY OF THE INVENTION

The proposed wearable bp monitoring systems have limitations. The first proposed system that includes the Apple Watch 5 device requires the individual to wear a separate bp cuff to obtain the bp measurements. This is awkward and increases cost. Also, if the bp cuff is not properly fit to the arm of the individual, the bp cuff will produce inaccurate bp measurements. The watch merely displays the bp measurements without checking their accuracy. Moreover, both proposed systems are not as accurate as the traditional bp monitoring systems and require periodic manual calibration.

An inventive biosensor system is proposed. This system includes an acoustical assembly and a data analysis system. The acoustical assembly includes an earbud system and an ear canal into which the earbud system is inserted. The earbud seal creates an enclosed acoustic chamber within the ear canal that is bounded by walls of the ear canal and surfaces of the earbud. Typically, the earbud system is a headset worn by the individual. The earbud system includes at least one earbud that continuously detects acoustic signals including audible and infrasonic signals. In particular, the infrasonic signals include hemodynamic pressure signals from the body of the individual.

The earbud includes an in-ear acoustic sensor that detects the acoustic signals and sends the electronic representation of the signals to the data analysis system for processing and analysis. In one example, the data analysis system is a controller board of the earbud system.

In more detail, the earbud is designed to sit within an outside portion of and make an acoustic seal with the individual's ear canal. An acoustic earbud seal, or "earbud fit," enables acoustic pressure in the enclosed acoustic chamber within the ear canal to rise and be maintained over time. A strong earbud seal is characterized by a negligible acoustic leak of outside air into the ear canal. When the earbud seal is applied to the ear canal, the ear canal is also referred to as an occluded ear canal.

The earbud seal changes over time, which affects the acoustic pressure level. This is due to movement of the individual, and adjustment of the earbud(s) by the individual (intentional or unintentional), in examples. As the earbud seal decreases, the acoustic pressure level also decreases. This effect is also known as a "leak" of the acoustical assembly.

Losses in the acoustic pressure level/leaks affect the acoustic signals in the ear canal. In general, leaks cause attenuation of the amplitudes of the acoustic signals. In particular, leaks especially attenuate the infrasonic signals of the acoustic signals. Because the hemodynamic pressure signals are among these infrasonic signals and carry the majority of the cardiovascular information of the individual that the biosensor system is designed to detect and analyze, the biosensor system must monitor the acoustical assembly for leaks.

The data analysis system can also correct the hemodynamic pressure signals for any acoustic leak. The data analysis system can then infer hemodynamic measurements directly from the hemodynamic pressure signals, or calibrate the signals prior to obtaining the bp measurements using a reference bp signal from a reference bp monitoring system. The data analysis system can then send various notification messages (e.g., audio, visual, text-based) to user devices to report the hemodynamic pressure signals and/or measurements obtained from the pressure signals to the individual, and to update medical records of the individual.

The inventive biosensor system provides advantages over the proposed wearable bp monitoring systems. In one example, the system continuously obtains the hemodynamic pressure signals from the individual, and may correct the signals for an acoustic leak before determining the bp measurements. For this purpose, in one implementation, the data analysis system continuously determines changes to the leak level over time based upon changes to the hemodynamic pressure signals over time, and corrects the signals when the changes to the signals (e.g., average amplitude differences) exceed a threshold value. Such an automated feedback capability improves the accuracy of the system and is not provided in the proposed wearable bp monitoring systems.

In general, according to one aspect, the invention features a biosensor system that includes an acoustical assembly and a data analysis system. The acoustical assembly includes an earbud system that forms an earbud seal with an ear canal of an individual, and the earbud system includes an earbud with an in-ear acoustic sensor that detects acoustic signals in the ear canal. The acoustic signals include audible signals and infrasonic signals.

The data analysis system receives the acoustic signals from the earbud system, identifies hemodynamic pressure signals from a body of the individual included within the infrasonic signals, and identifies signal characteristics of the hemodynamic pressure signals over time. In one embodiment, the data analysis system corrects the hemodynamic pressure signals for effects caused by leaks in the earbud seal based upon changes to the signal characteristics over time.

The data analysis system also computes hemodynamic measurements of the individual from the hemodynamic pressure signals. In examples, the signal characteristics can include amplitudes and pulse widths of the hemodynamic pressure signals.

Typically, the data analysis system determines the changes to the signal characteristics of the hemodynamic pressure signals over time by determining whether a difference between signal characteristics of hemodynamic pressure signals for a current monitoring interval and signal characteristics of hemodynamic pressure signals for a previous monitoring interval exceeds a threshold value.

The data analysis system classifies the hemodynamic pressure signals as leaky pressure signals in response to determining that the changes to the signal characteristics over time have exceeded a threshold value, and then corrects the leaky pressure signals into corrected pressure signals. In another embodiment, the data analysis system also computes hemodynamic measurements of the individual from the corrected pressure signals.

In one implementation, the data analysis system computes a leak correction filter based upon a set of combined acoustic signals included within the acoustic signals. For this purpose, the set of combined signals were detected in the ear canal over a leak correction time period and include a leak identification stimulus (LIS) signal combined with the leaky pressure signals. The data analysis system applies the leak correction filter to transformed versions of the leaky pressure signals to compute the corrected pressure signals.

In one example, the LIS signal is an active LIS signal that the data analysis system selects from a memory and introduces into the ear canal via a speaker included within the earbud. In another example, the LIS signal is a passive LIS signal that the data analysis system derives from the acoustic signals. In still another example, the LIS signal is an infrasonic signal.

In one implementation, the data analysis system is included within a user device carried by the individual that is in communication with the earbud system. In another implementation, the data analysis system is included within the earbud system. In yet another limitation, the data analysis system is included within a network that is remote to the acoustical assembly.

In general, according to another aspect, the invention features a method for a biosensor system. In this method, an earbud system of an acoustical assembly forms an earbud seal with an ear canal of an individual. The earbud system includes an earbud with an in-ear acoustic sensor, and the earbud detects acoustic signals in the ear canal. The acoustic signals include audible signals and infrasonic signals. A data analysis system receives the acoustic signals from the earbud system, identifies hemodynamic pressure signals from a body of the individual included within the infrasonic signals, and identifies signal characteristics of the hemodynamic pressure signals over time. The data analysis system also corrects the hemodynamic pressure signals for effects caused by leaks in the earbud seal based upon changes to the signal characteristics over time.

Also in this method, the data analysis system calculates changes to the signal characteristics of the hemodynamic pressure signals over time by computing a baseline value based on signal characteristics of the hemodynamic pressure signals over a time interval, computing a new baseline value based on signal characteristics of new hemodynamic pressure signals over a next time interval, and determining whether a difference between the baseline value and the new baseline value exceeds a threshold value.

Additionally, the data analysis system receives a reference blood pressure (bp) signal from a reference bp monitoring system, computes a bp transfer function by comparing signal characteristics of the hemodynamic pressure signals to that of the reference bp signal, and applies the bp transfer function to the hemodynamic pressure signals to obtain a calibrated hemodynamic signal.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 4D and 4E are transfer function plots of different calibrated hemodynamic signals calculated in accordance with the method of FIG. 3, where: the plot in FIG. 4D was calculated using leaky pressure signals, but the signals were not corrected for adverse effects caused by the leak; and the plot of FIG. 4E was computed for hemodynamic pressure signals that did not require correction;

FIGS. 7A and 7B are schematic diagrams that include plots of exemplary signals that are either used or calculated in the method of FIG. 6, and illustrate its operation;

FIG. 7C is a plot of an exemplary leak correction filter calculated in the method of FIG. 6;

FIGS. 8A and 8B are plots of additional signals calculated in the method of FIG. 3;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" or "current" and "previous" may be used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
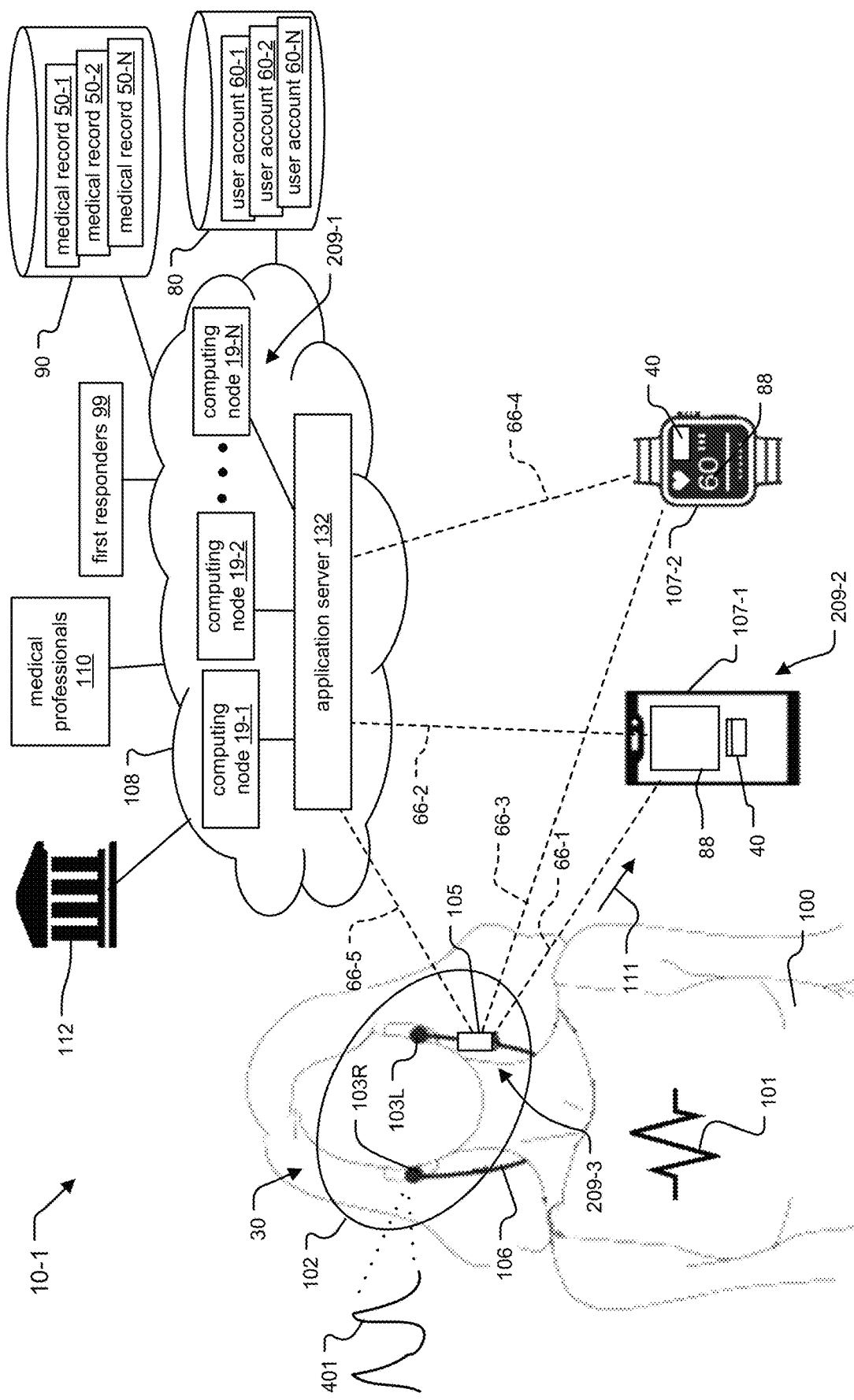
FIG. 1A is a schematic diagram of one embodiment of an inventive biosensor system constructed according to principles of the present invention, where the biosensor system includes an acoustical assembly and one or more data analysis systems, and where the acoustical assembly includes an earbud system worn by an individual.

FIG. 1A shows an exemplary biosensor system 10-1 for hemodynamic monitoring of individuals 100. The system 10-1 detects acoustic signals in ear canals of the individual 100. The acoustic signals include audible signals and infrasonic signals. In one example, the infrasonic signals include hemodynamic pressure signals 401 from a body of the individual 100.

The biosensor system 10-1 has various components. These components include an acoustical assembly 30, data analysis systems 209-1 through 209-3, and at least one user device 107. The components also include an application server 132, a medical record database 90 and a user database 80. Various facilities 112, first responders 99, and health care professionals 110 are also shown. A network cloud 108 enables connections between these various components.

The acoustical assembly 30 includes an earbud system 102 with left and right earbuds 103L, R and includes the ear canals of the individual 100 within which the earbuds 103 are inserted. The earbud system 102 also includes a controller board 105 that connects to the earbuds 103 via an earbud connection 106.

In the illustrated example, the individual 100 is wearing a head-mounted earbud system 102. The earbuds 103 communicate with one another and with the controller board 105 via the earbud connection 106. Here, the earbud connection 106 is a wired connection, but could also be a wireless connection.

The earbuds 103 include acoustic transducers (e.g., microphones, infrasound and vibration sensors, pressure sensor, and/or other sensors) that detect acoustic signals in the infrasonic and audible frequency ranges, typically from the ear canal of the individual 100. The acoustic signals are generated by the blood flow, muscles, mechanical motion, and neural activity of the individual 100, in examples. In particular, the detected acoustic signals include the hemodynamic pressure signals 401 that are associated with the stroke volume, blood flow, cardiovascular activity/cardiac function, and blood pressure of the individual 100. In another example, the acoustic signals include audible and infrasonic signals presented by a speaker of one or more of the earbuds into the ear canal(s).

The earbuds 103L,103R are inserted in the left and right ear canals to form a seal with an inner surface of each ear canal. A satisfactory seal level of the earbuds/earbud seal is also known as "proper fit" of the earbuds, and thus a proper fit of the overall biosensor system 10. A proper fit of the earbuds provides a sufficient quality (e.g., amplitude and dynamic range) of the detected acoustic signals with minimal noise.

More detail for the data analysis systems 209 is as follows. Data analysis system 209-1 is a processing system that is located in a network that is remote to the earbud system. Data analysis system 209-2 is included within the smartphone user device 107-1, while data analysis system 209-3 is incorporated within the controller board 105 of the earbud system 102.

In one implementation, as shown in the figure, data analysis system 209-1 and the application server 132 are located within a network cloud 108. The data analysis system 209-1 includes one or more computing nodes 19-1 . . . 19-N that are distributed across one or more networks within the network cloud 108. Alternatively, the computing nodes 19 and/or the server 132 might also be located on a local area network within a premises, such as a residence, commercial building or place of business of the individual 100.

The application server 132 is a computing device that communicates with various components. These components include the user devices 107, the in-ear biosensor system 102 and the data analysis system 209. In addition, because the server 132 is within the network cloud 108, the server 132 can communicate with the facilities 112, the health care professionals 110, the first responders 99, and the databases 80/90.

The user devices 107 include portable user devices and/or stationary user devices. In examples, the portable user devices include a mobile phone 107-1 and a smartwatch 107-2. The stationary devices include workstations, tablets, and laptops, in examples.

Each user device 107 is a computing device that includes a display 88 and one or more applications. An instance of an interactive user application ("user app") 40 that executes in a memory of each user device 107 is shown. Each user device also includes a processor and an operating system that loads each user app 40 into the memory for execution by the processor.

The user app 40 of each user device 107 receives information sent by other components in the biosensor system 10-1 and presents a graphical user interface (GUI) on the display 88. The GUI allows the individual 100 to enter information for the user app 40 and can display various information upon the display 88. User device 107-1 additionally includes or otherwise incorporates data analysis system 209-2.

The facilities 112, the first responders 99, the health care professionals 110, the user database 80 and the medical record database 90 connect to the network cloud 108. These connections could be wired internet-based or telephony connections, wireless cellular connections, and/or wireless internet-based connections (e.g., Wi-Fi), in examples.

The medical record database 90 includes medical records 50 of the individuals 100 and the user account database 80 includes user accounts 60 of the individuals 100. The facilities 112 include medical facilities such as hospitals, clinics and private medical offices. The health care professionals 110 include doctors, nurses/nurse practitioners and physician's assistants, in examples. The first responders 99 include police, fire, and possibly other emergency response personnel.

The earbud system 102 and the user devices 107 communicate with each other and with the network cloud 108 via wireless communications links 66. In more detail, the user device 107-1 connects to the earbud system 102 via wireless link 66-1, and connects to the application server 132 via wireless link 66-2. Similarly, the smartwatch 107-2 connects to the earbud system 102 via wireless link 66-3 and to the application server 132 via wireless link 66-4. The earbud system 102 may also communicate with the application server 132 and other components in the network cloud 108 via high-speed wireless link 66-5. The wireless links 66 might be cellular-based (e.g., 5G cellular links) or Internet-based (e.g., IEEE 802.11/Wi-Fi, or possibly even Bluetooth). Bluetooth is a registered trademark of Ericsson AG.

The application server 132 determines whether individuals 100 are authorized users of the system 10. For this purpose, the individuals 100 wear user devices 107 that include credentials that identify the individuals. These credentials can be in the form of a username and password, and/or biometric identifier such as a fingerprint or iris scan, in examples. Via the user apps 40 on the user devices 107, the user devices 107 send the credentials over the wireless link 66-2 to the application server 132. The server 132 then compares the credentials to stored credentials for the individuals in the user account database 80. The stored credentials for the individuals are located in separate user accounts 60-1 . . . 60-N within the user account database 80.

The biosensor system 10-1 generally operates as follows. The individual 100 accesses the user app 40 of a user device 107, such as smart phone user device 107-1 worn/carried by the individual 100. The individual 100 enters his/her credentials in the user app 40, which in turn establishes an authenticated login session over wireless connection 66-2 between the user app 40 and the application server 132. An authenticated individual 100 is a valid user of the system 10.

Once the individual 100 is authenticated, the user app 40 of user device 107-1 establishes wireless connection 66-1 between the user device 107-1 and the controller board 105. The user app 40 then sends various commands over the wireless connection 66-1 to a controller (e.g., microprocessor, microcontroller) at the controller board 105. Some of these commands instruct the controller to begin or to stop processing the detected acoustic signals received from the earbuds 103, in one example.

In one implementation, the controller receives and processes the detected acoustic signals sent by the earbuds 103. For this purpose, the controller board 105 operates as data analysis system 209-3 or otherwise includes components of a data analysis system. In other implementations, the controller receives the detected acoustic signals from the earbuds 103 and then uses either of the data analysis system 209-1 or 209-2 to process the detected acoustic signals. In still other implementations, the earbuds 103 might send the detected acoustic signals directly to the data analysis system 209-1 or 209-2 for processing.

The data analysis system 209 also calculates the signal characteristics of the hemodynamic pressure signals over time. The signal characteristics are periodically calculated in real-time and are based upon the hemodynamic pressure signals 401 during each time period.

While processing the acoustic signals, the controller and/or data analysis system 209 can send notification messages 111 to various components of the biosensor system 10-1 and to the medical facilities 112, the health care workers 110, the first responders 99 and the individual 100. The messages can be in visual, textual or audible form, or any combination of these. The messages might include leak corrected infrasonic pressure signals, the calibrated bp signals of the individual 100 and/or information concerning operation of the biosensor system 10-1 and its components. In examples, the messages might also include information instructing the individual 100 to adjust the fit of their earbuds and/or to seek medical attention.

Figure 1B:
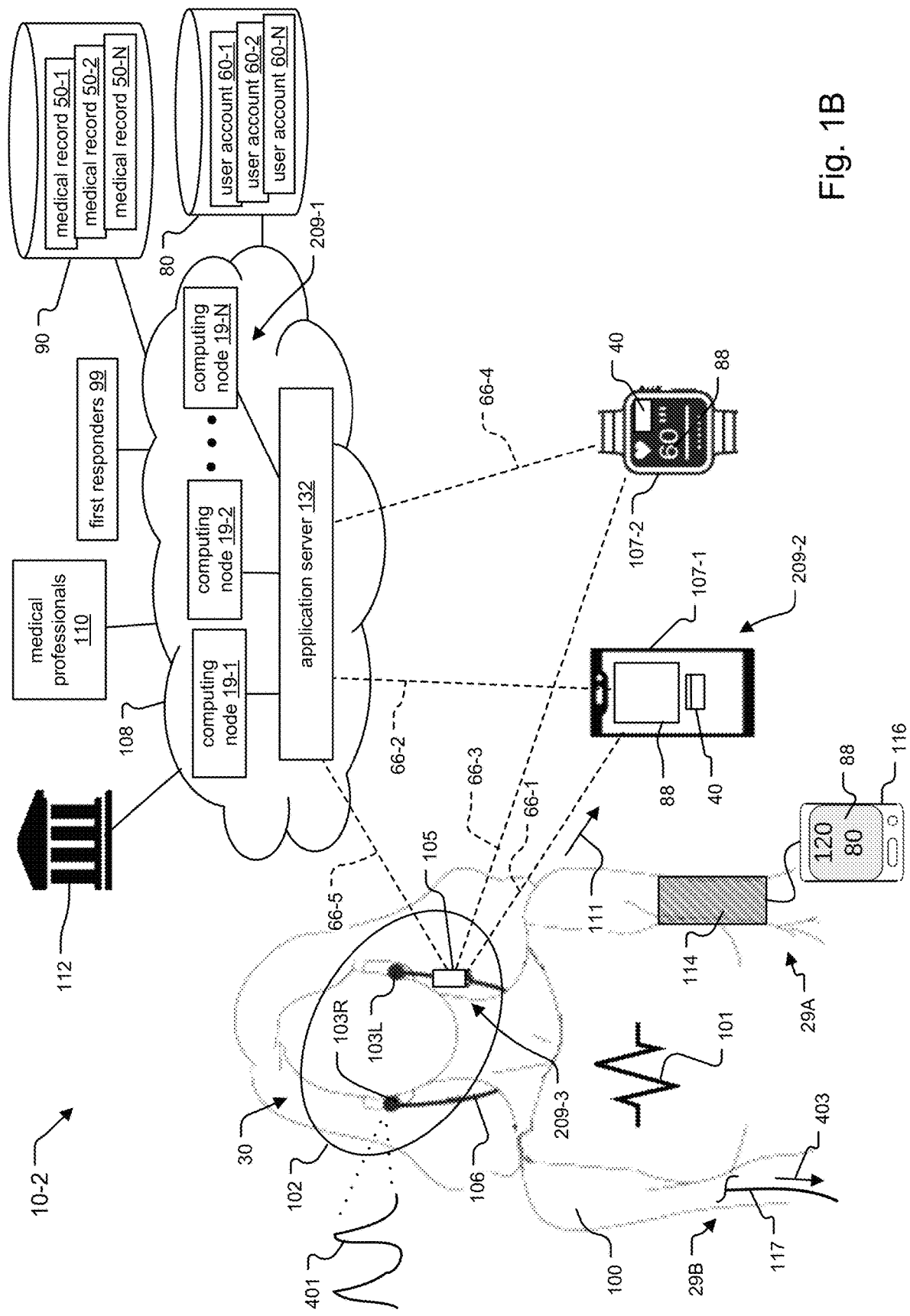
FIG. 1B is a schematic diagram of another embodiment of the biosensor system, where the biosensor system includes similar components as the system in FIG. 1A and also includes one or more reference blood pressure (bp) monitoring systems that provide reference bp signals.

FIG. 1B shows another embodiment of the biosensor system 10-2. Here, the system includes substantially the same components and operates in substantially a similar manner as the system in FIG. 1A. However, there are differences.

The biosensor system 10-2 includes one or more reference bp monitoring systems 29A and 29B. These systems obtain and then provide reference bp signals to the data analysis systems 209 and possibly to other components of the biosensor system 10-2 for calibration purposes. A sphygmomanometer reference bp monitoring system ("bp cuff system") 29A and a catheter system reference bp monitoring system ("catheter system") 29B, are shown.

The bp cuff system 29A includes a bp cuff 114 that attaches non-invasively to the individual's arms and connects to a display 116. The catheter system 29B includes a catheter 117. One end of the catheter 117 is typically inserted into a blood vessel in the individual's arm, groin or neck area and threaded through the blood vessel until the end rests in the aorta. The opposite end of the catheter 117 is external to the body and connects to a processing unit with a display (not shown). In the illustrated example, reference bp signal 403 provided by the catheter system 29B is shown. The reference bp signal 403 is expressed in units of mmHg.

The bp cuff system 29A and the catheter system 29B obtain their reference bp signals as follows. During each heartbeat of the individual, blood is pumped out of the heart through the aorta and exerts a significant pressure on the interior walls of the aorta. These pressure waveforms may dissipate into the body through various signal paths (e.g., the various blood vessels of the cardiovascular circulatory system). In one example, pressure waveforms in the blood vessels originate at the aorta and carry through the arteries and veins.

The data analysis system 209 then processes the acoustic signals in conjunction with the reference bp signal to obtain a calibrated bp signal of the individual 100. The data analysis system then obtains bp measurements of the individual 100 from the calibrated bp signal.

Figure 2:
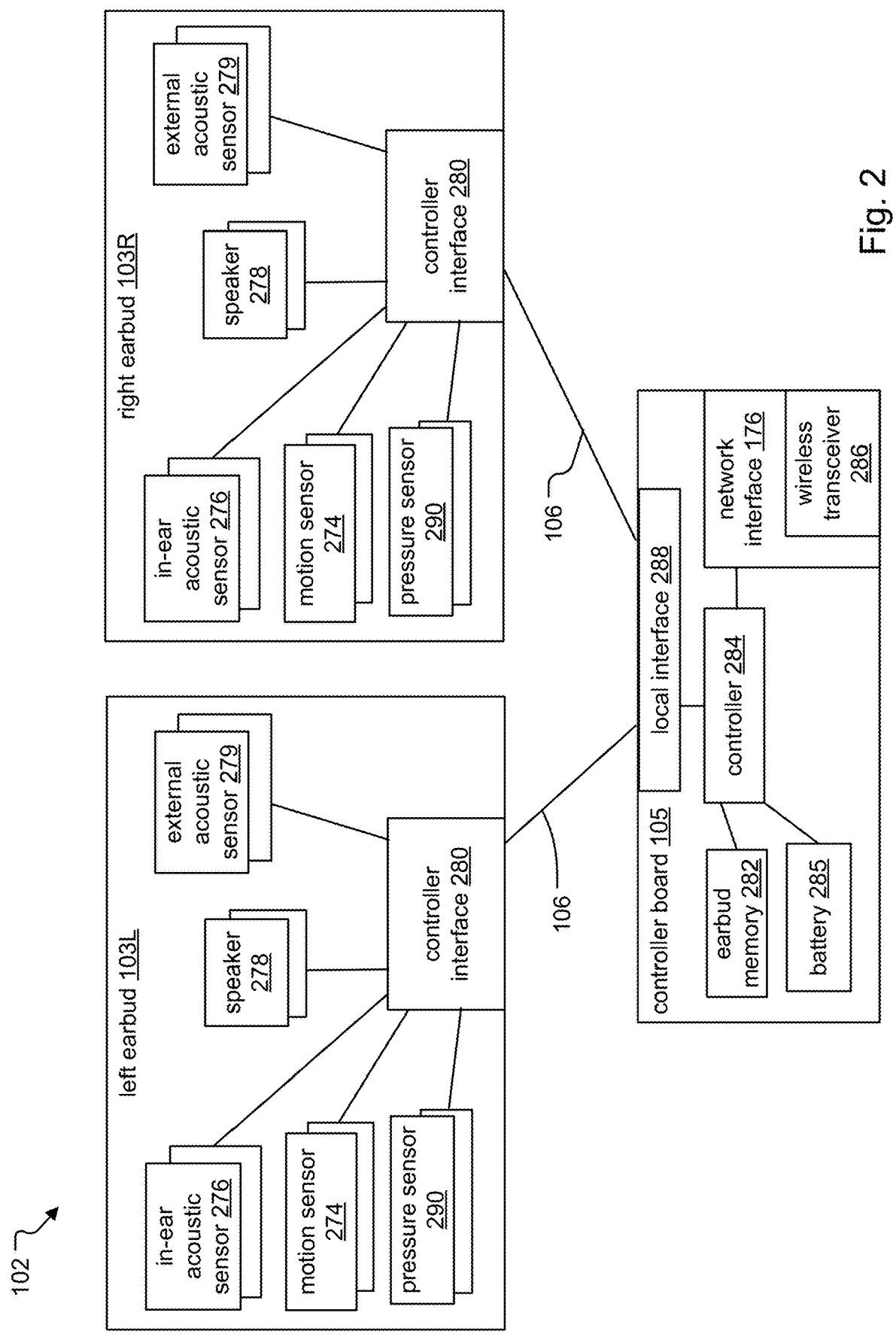
FIG. 2 is a schematic diagram showing detail for components of the earbud system in FIGS. 1A and 1B.

FIG. 2 shows detail for the earbud system 102 in FIGS. 1A and 1B. The left and right earbuds 103L,103R include substantially the same components and operate in substantially the same way. The earbuds 103 each include one or more motion sensors 274, in-ear acoustic sensors 276, speakers 278, pressure sensors 290, external acoustic sensors 279 and a controller interface 280. The motion sensors include accelerometers and gyroscopes, in examples.

The controller board 105 includes a local interface 288, an earbud memory 282, a battery 285, a controller 284, and a network interface 176. The network interface 176 further includes a wireless transceiver 286. The controller board 105 provides power to and enables communications between the earbuds 103L, 103R via the local interface 288 and the earbud connection 106.

Within the earbuds 103, the controller interface 280 connects to the sensors 274, 276, 290 and the speakers 278. The controller interface 280 also connects to the controller board 105 via the earbud connection 106. In one implementation, the controller interface 280 is a wired bus.

Within the controller board 105, the controller 284 connects to local interface 288, the earbud memory 282, the battery 285, and the network interface 176. The controller 284 can be configured as a microcontroller or microprocessor. In one example, the controller 284 is a reprogrammable Field Programmable Gate Array (FPGA). The controller 284 controls the operation of the other components in the controller board 105.

Infrasound refers to a range of sound signals that have a frequency below the range of human hearing. Typically, infrasound signals are associated with sounds that are in the range of 0.01 Hertz (Hz) to 20 Hz. The frequency range of human hearing for a 20 year-old healthy adult, by contrast, is typically above 20 Hz but less than 18 kHz.

The sensors of the earbuds 103 generally operate as follows. The in-ear acoustic sensors 276 (e.g., microphone) detect sound waves from the individual 100 in both the audible and infrasonic ranges. The acoustic sensors 276 represent the detected sound waves as the acoustic signals. The motion sensors 274 detect movement of the individual (e.g., moving, sneezing), and represent the motion as motion artifacts within the acoustic signals. The pressure sensors 290 detect pressure waves within the ear canal and represent the pressure waves as pressure signals. The external acoustic sensors 279 detect sound waves from the environment to record noise from external sources (e.g., for active noise cancellation). In another implementation, the earbuds 103 might include separate audible sensors and infrasound/vibration sensors instead of the acoustic sensor 276.

The controller board 105 receives the acoustic signals sent from the earbuds 103 and transmits the acoustic signals to other components in the biosensor system 10 via the network interface 176. The controller 284 receives the acoustic signals via the local interface 288, and buffers the signals in the earbud memory 282 or in local memory of the network interface 176. The network interface 176 then sends the acoustic signals via the wireless transceiver 286 to other components of the biosensor system 10.

The controller board 105 also receives information from other components in the biosensor system 10 via the network interface 176. This information includes notification messages 111 for (audible) presentation at the earbuds 103L, 103R, and commands sent from the user app 40. In another example, the information includes updates for application code running within the controller 284. In yet another example, the information includes replacement image files for updating the internal logic of the controller 284 (e.g., when the controller is an FPGA or the earbud memory 282 is configured as a non-volatile storage device that can be electrically erased and reprogrammed).

It can also be appreciated that the components of the controller board 105 might be incorporated into one of earbuds 103, distributed across the earbuds 103, or distributed across the earbuds 103 and the controller board 105 in a different fashion than shown in FIG. 2. In one implementation, the controller 284 is located outside the earbud system 102. Here, the controller might be a processor of the user device 107-1 carried by the individual 100. In another implementation, the controller 284 would be incorporated into either earbuds 103L or 103R, with the earbud connection 106 being wireless (e.g., Bluetooth).

A computing device includes at least one or more central processing units (CPUs) and a memory. The CPUs have internal logic circuits that perform arithmetic operations and execute machine code instructions of applications ("application code") loaded into the memory. The instructions control and communicate with input and output devices (I/O) such as displays, printers and network interfaces.

The CPUs of the computing devices are typically configured as either microprocessors or microcontrollers. A microprocessor generally includes only the CPU in a physical fabricated package, or "chip." Computer designers must connect the CPUs to external memory and I/O to make the microprocessors operational. Microcontrollers, in contrast, integrate the memory and the I/O within the same chip that houses the CPU.

The CPUs of the microcontrollers and microprocessors execute application code that extends the capabilities of the computing devices. In the microcontrollers, the application code is typically pre-loaded into the memory before startup and cannot be changed or replaced during run-time. In contrast, the CPUs of the microprocessors are typically configured to work with an operating system that enables different applications to execute at different times during run-time.

The operating system has different functions. The operating system enables application code of different applications to be loaded and executed at run-time. Specifically, the operating system can load the application code of different applications within the memory for execution by the CPU, and schedule the execution of the application code by the CPU. In addition, the operating system provides a set of programming interfaces of the CPU to the applications, known as application programming interfaces (APIs). The APIs allow the applications to access features of the CPU while also protecting the CPU. For this reason, the operating system 172 is said to execute "on top of" the CPU. Other examples of CPUs include Digital Signal Processors (DSPs), Application Specific Integrated Circuits (ASICs), and Field Programmable Gate Arrays (FPGAs).

The DSPs convert various types of input into digital signals, and perform operations upon the digital signals such as filtering, compression, conversion and transformation. The DSPs usually support analog to digital (A/D) and digital to analog (D/A) conversion and transformations including Fourier, Z, and wavelet transforms, in examples.

Figure 3:
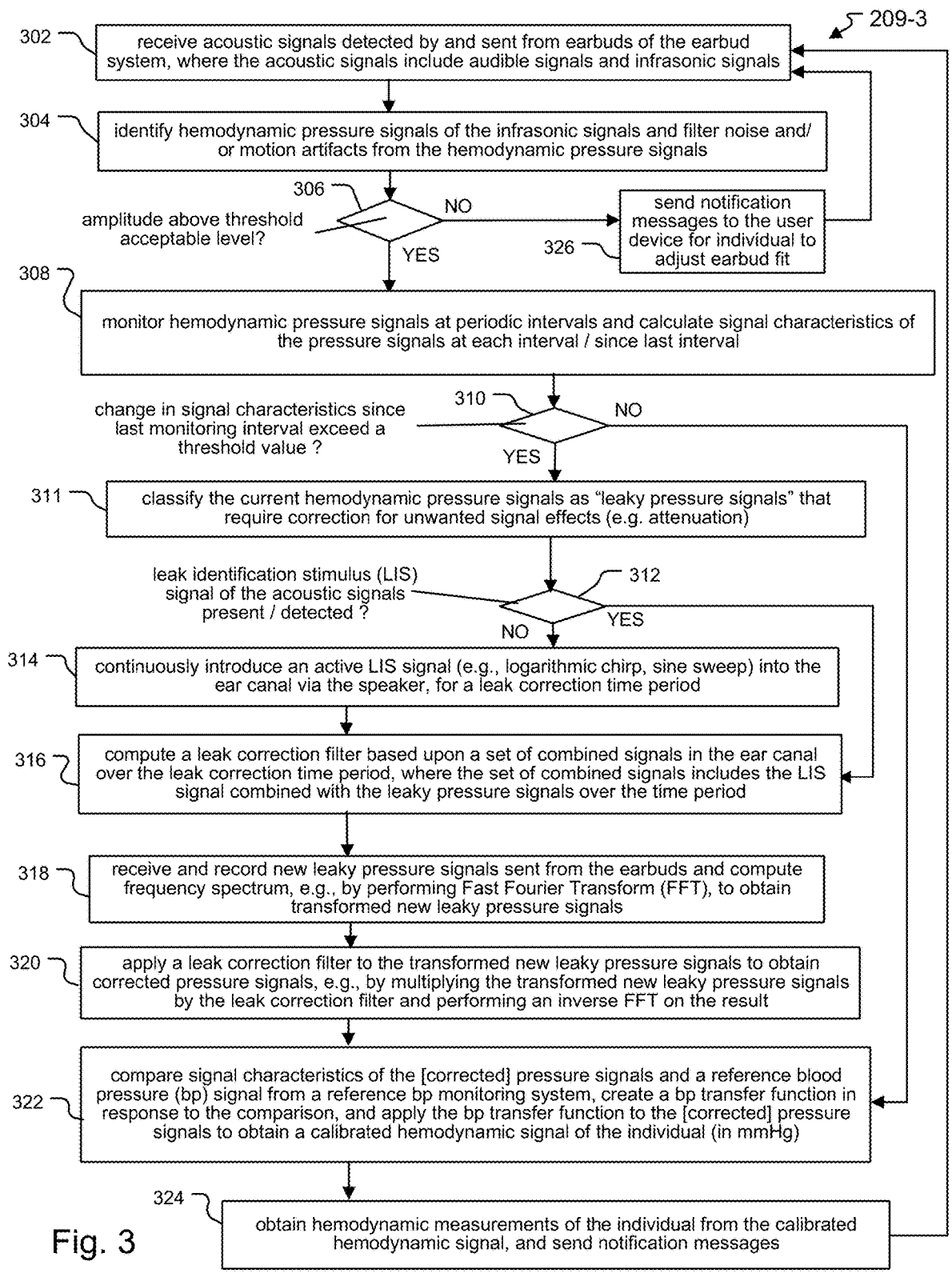
FIG. 3 is a flowchart that describes a method of operation for the data analysis system, according to an embodiment, where the method describes how the data analysis system monitors changes in the characteristics of the hemodynamic pressure signals over time to gauge a leak level of the acoustic assembly, corrects hemodynamic pressure signals adversely affected by the leak ("leaky pressure signals") for unwanted signal effects, and computes bp measurements of the individual from the hemodynamic pressure signals or from their corrected versions.

FIG. 3 describes a method of operation of the biosensor system 10, according to an embodiment. The method describes how data analysis system 209-3 processes the acoustic signals detected by and sent from the earbuds 103L,R of the earbud system 102. The method begins in step 302.

In step 302, the data analysis system 209-3 receives acoustic signals detected by and sent from the earbuds 103 of the earbud system 102. The acoustic signals include audible signals and infrasonic signals. In step 304, the data analysis system 209-3 removes electrical and environmental noises from the hemodynamic pressure signals 401 of the infrasonic signals using baseline removal and filtering techniques, in examples. In one implementation, a bandpass filter can be applied to the pressure signals 401 to remove high frequency noise and low frequency baseline drifts.

The hemodynamic pressure signals 401 typically have fundamental components at frequencies between 0.5 Hz and 2 Hz, and significant harmonics that typically extend from 2 Hz to 10 Hz. The data analysis system 209 uses this information to identify whether a pressure signal 401 is present in at least one of the filtered acoustic signals acquired from the earbuds 103.

In step 306, the data analysis system 209 determines whether the amplitude of the hemodynamic pressure signals 401 is above (i.e., greater than) an acceptable threshold level. If the pressure signals 401 are not above the acceptable threshold level, the method transitions to step 326; otherwise, the method transitions to step 308.

In step 326, the data analysis system 209 sends notification messages 111 to one or more of the user devices 107. Here, the messages at least notify the individual 100 of a likely proper improper fit of the one or more earbuds 103 and the need for the individual 100 to adjust their earbuds. The method then transitions back to step 302 for the controller 284 to access new acoustic signals detected by and sent from the biosensor system 102.

In step 308, the data analysis system 209 monitors the hemodynamic pressure signals 401 at periodic intervals and calculates specific signal characteristics of the pressure signals 401 that are indicative of a leak at each interval/since the last interval. In one example, the time interval is in a range between 10 and 15 seconds, inclusive.

More detail for the signal characteristics of the pressure signals 401 is as follows. The signal characteristics include features or other aspects of the pressure signals 401 that are indicative of a leak in the earbud seal of the acoustic assembly. These features are especially affected by leaks in the earbud seal and are thus good indicators of a leak. The features can include amplitudes of the pressure signals 401, and/or pulse widths of the pressure signals 401.

According to step 310, the data analysis system 209 calculates a change in the signal characteristics since the last monitoring interval, and determines whether the change has exceeded a threshold value. The threshold value can be a number or a percentage. In one example, the threshold value is a real number or value expressed in decibels (dB). In another example, the threshold value is a percentage, such as 10%. In still another example, a negative difference between "current" and "last" signal characteristics is determined. If the absolute value of the difference exceeds a threshold value of 10%, the data analysis system 209 concludes that the current hemodynamic pressure signals 401 require correction for leak effects.

If the change in the signal characteristics since the last monitoring interval exceeds the acceptable threshold value, the method transitions to step 311; otherwise, the method transitions to step 322.

In step 311, the hemodynamic pressure signals 401 have unwanted effects due to the leak. The pressure signals 401 are typically reduced in amplitude, especially in the infrasonic range, and might include unwanted signal components (e.g., additional noise from the outside environment). These pressure signals are also known as leaky pressure signals. The data analysis system 209 classifies the signals as leaky pressure signals that require correction for these unwanted signal effects, and the method transitions to step 312.

Steps 312 through 320 describe how the data analysis system 209 performs leak correction upon the leaky pressure signals, to minimize the unwanted effects upon the signals caused by the leak. For this purpose, in general, the data analysis system 209 calculates a leak correction filter based upon a leak identification stimulus ("LIS") signal introduced into the inner ear canal for a leak correction time period. The data analysis system then applies the leak correction filter to new leaky pressure signals to correct for effects caused by the excessive leak level.

The LIS signal can be either an active or a passive LIS signal. An active LIS signal is an acoustic signal such as a chirp or a combination of sine waves that the data analysis system 209 introduces into the ear canal via a speaker included within one or more of the earbuds 103. A passive LIS signal, in contrast, is derived from the acoustic signals detected by the in-ear acoustic sensors. When deriving the passive LIS signal, in examples, the data analysis system 209 might filter select audible sounds in a specific frequency range from audio signals played by the user 100 to obtain audio signals with only low-frequency components such as low-frequency bass tones (e.g., between 20 and 30 Hz).

In step 312, the controller 284 checks whether the individual 100 is already playing an acoustic stimuli (e.g., music) through the earbud speakers 278. If the speakers 278 are already being used, the data analysis system 209 might use a passive LIS signal rather than using an active LIS signal. Otherwise, the data analysis system 209 selects a pre-stored stimuli (i.e., active LIS signal) such as a sequence of single tones from the earbud memory 282 to use as a reference LIS signal. In the illustrated example, an active LIS signal is selected.

In step 314, the data analysis system 209 continuously introduces active LIS signals (e.g., logarithmic chirp, sine sweep, sum-of-sines) into the ear canal via the speaker(s) 278, for a leak correction time period. The method then transitions to step 316.

Step 316 can be reached from both steps 312 and 314. Step 316 is reached from step 312 when an LIS signal is already detected in the ear canal. According to step 316, the controller 284 computes a leak correction filter based upon a set of combined signals in the ear canal over the leak correction time period. The set of combined signals includes the LIS signal combined with the leaky pressure signals over the time period.

In step 318, the data analysis system 209 receives and records new leaky pressure signals sent from the earbuds 103 and computes its frequency spectrum, e.g., by performing a Fast Fourier Transform (FFT), to obtain transformed new leaky pressure signals.

Then, in step 320, the data analysis system 209 applies the leak correction filter to the transformed new leaky pressure signals to obtain corrected pressure signals. For this purpose, in one example, the controller 284 obtains the corrected pressure signals by multiplying the transformed new leaky pressure signals by the leak correction filter and performing an inverse FFT on the result. Alternatively, the controller might convert the leak correction filter to its time-domain representation using an inverse FFT, and perform convolution upon the new leaky pressure signals to obtain the corrected pressure signals. The method then transitions to step 322.

Step 322 can be reached from both steps 310 and 320. If step 322 is reached from step 310, the actions of step 322 are performed on hemodynamic pressure signals 401 (i.e., signals 401 that do not require correction); if reached from step 320, the actions of step 322 are performed on corrected pressure signals. Next, in step 322, the data analysis system 209 compares signal characteristics of the [corrected] pressure signals and a reference bp signal (in mmHg). The controller 284 then creates a bp transfer function in response to the comparison. In one implementation, the controller 284 uses a pre-calculated bp transfer function that is calculated using reference bp signals obtained from reference bp monitoring systems such as the bp cuff 29A or the catheter system 29B. In another example, the data analysis system 209 can access template libraries of the bp transfer functions created using simulations of the cardiovascular system and based on catheter data from clinical trials.

The data analysis system then applies the bp transfer function to the [corrected] pressure signals to obtain a calibrated hemodynamic signal of the individual 100 (in mmHg).

According to step 324, the data analysis system obtains hemodynamic measurements of the individual from the calibrated hemodynamic signal. The hemodynamic measurements can include bp measurements and cardiac function measurements, in examples.

Finally, the data analysis system 209 also sends notification messages. These messages typically include the hemodynamic measurements, for updating the medical record 50 of the individual and reporting this information to the individual 100 and/or to the health care professionals 110. In one implementation, the controller 284 carries out step 322. Additionally or alternatively, the data analysis system 209 can perform this step. Upon completion of step 324, the method transitions back to step 302.

In another implementation, the hemodynamic measurements can be calculated directly from the hemodynamic pressure signals 401 if the signals 401 did not require correction in step 310.

Figure 4A:
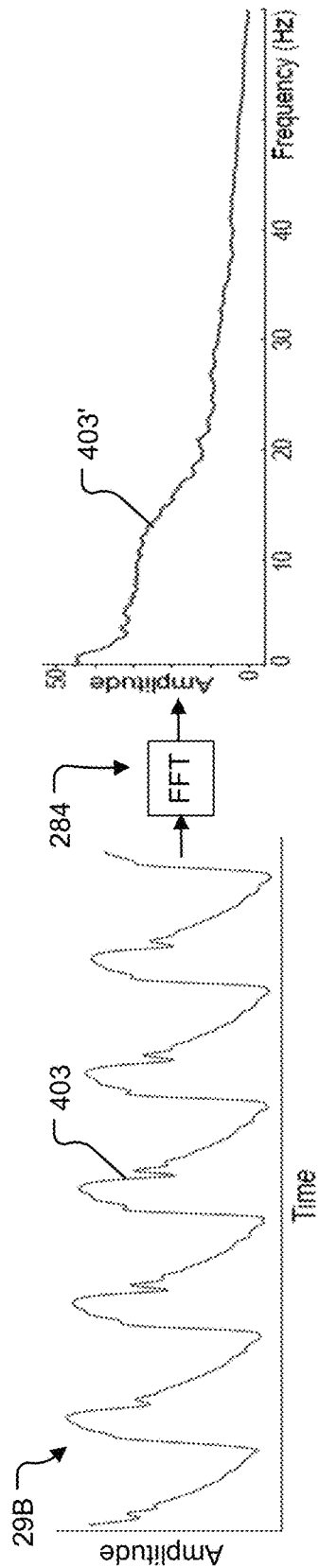
FIG. 4A-4C are schematic diagrams that include plots of exemplary signals that are either used or calculated in the method of FIG. 3, and illustrate the operation of the method of FIG. 3.
Figure 4B:
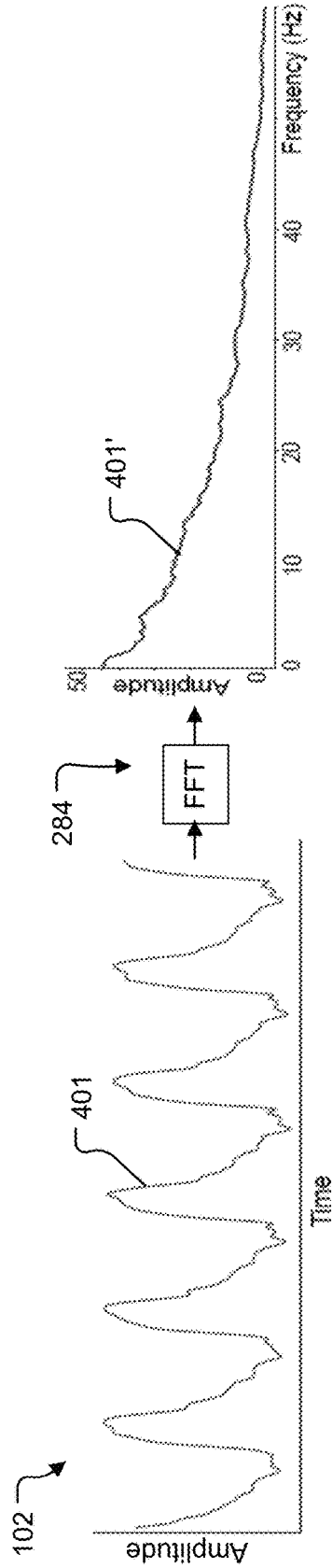
Figure 4C:
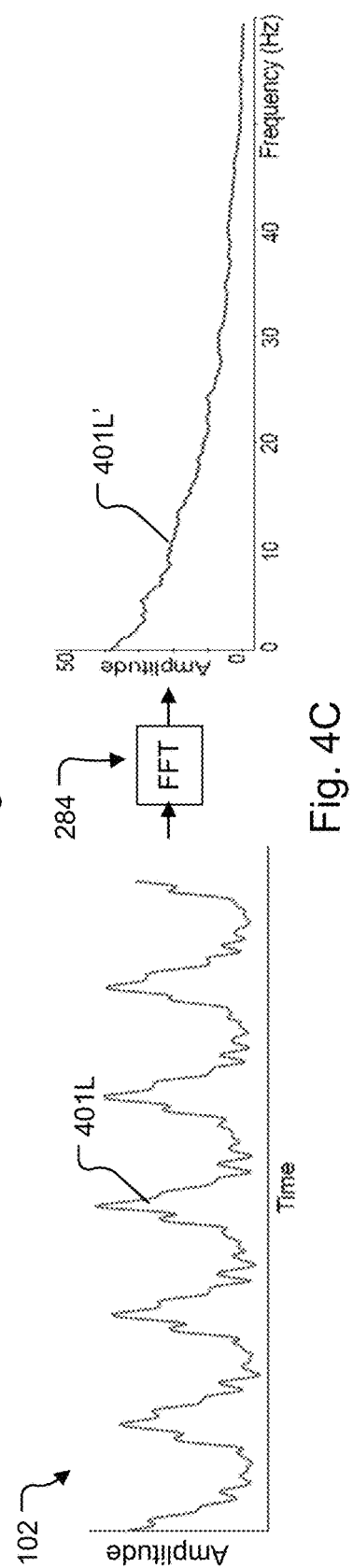

FIG. 4A through 4C show various signals used in the method of FIG. 3. These figures also show how the data analysis system 209 might calculate some of the signals, also in accordance with the method of FIG. 3.

FIG. 4A shows a plot of a reference bp signal 403 on the left; a plot of its frequency spectrum is shown on the right. The reference bp signal 403 was obtained from a catheter system 29B. The frequency spectrum of the reference bp signal 403 is obtained by performing a Fourier transform upon the reference bp signal 403. In one example, as shown, the Fourier transform is a fast Fourier transform (FFT). The frequency spectrum of the reference bp signal is also known as a transformed reference bp signal 403'.

FIG. 4B shows a plot of hemodynamic pressure signals 401 on the left; on the right, its frequency spectrum is shown. The pressure signals 401 were obtained by the earbuds 103L,R and sent to the data analysis system 209 for processing.

In the illustrated example, the data analysis system 209 receives the hemodynamic pressure signals 401 from the earbuds 103, and obtains the frequency spectrum of the pressure signals 401 by performing a Fourier transform upon the pressure signals 401. In one example, as shown, an FFT is used. The frequency spectrum of the pressure signals is also known as transformed pressure signals 401'.

FIG. 4C shows a plot of leaky infrasonic pressure signals ("leaky pressure signals") 401L on the left; on the right, a plot of its frequency spectrum is shown, otherwise known as transformed leaky pressure signals 401L'.

In the illustrated example, the data analysis system 209 receives the leaky pressure signals 401L from the earbuds 103, and obtains the frequency spectrum of the leaky pressure signals 401L by performing a Fourier transform upon pressure signals 401. In one example, as shown, an FFT is used. The frequency spectrum of the leaky pressure signals is also known as transformed leaky pressure signals 401L'.

FIGS. 4D and 4E are transfer function plots 408 of exemplary calibrated bp signals calculated by the data analysis system 209 for the same individual 100. The transfer functions are also plotted over the same time frame. A transfer function of a system is a mathematical function which models the output of the system for each possible input. It can be calculated by dividing the frequency spectrum of its output signal by its input signal, in one example. Here, the transfer functions relate the reference bp signal 403 to the hemodynamic pressure signal 401.

In FIG. 4D, transfer function 408L' was created from leaky pressure signals 401L that were obtained from at least one earbud 103 without correcting for adverse signal effects caused by the leak. The transfer function 408L' is created by subtracting the transformed reference bp signal 403' of FIG. 4A from the transformed leaky pressure signals 401L' of FIG. 4C. The transfer function 408L' can also be referred to as a leaky transfer function.

In FIG. 4E, a negligible leak level of the earbud system 102 was present when the controller 284 received the pressure signals 401. The signal characteristics of the pressure signals also had a negligible change as compared to the "previous" signal characteristics of the pressure signals obtained during the previous monitoring interval. As a result, no correction of the pressure signals 401 was necessary.

The transfer function 408' is created by subtracting the transformed reference bp signal 403' of FIG. 4A from the transformed pressure signals 401' of FIG. 4B. In the absence of a leak, the transfer function is relatively flat across all frequencies. Such a transfer function provides a substantially linear transformation upon the pressure signals 401 to obtain the calibrated bp signal, from which bp measurements of the individual 100 can be obtained.

Comparing the leaky transfer function 408L' of FIG. 4D to the transfer function 408' of FIG. 4E, the amplitude of the leaky transfer function 408L' is significantly less across all frequencies, and its magnitude decreases at low frequencies (here, the infrasonic frequencies). This indicates the presence of an acoustic leak in the earbud system 102, which typically affects low frequency signals.

Also by way of comparison, reference 430A and 430B indicate slopes of the transfer function in FIGS. 4D and 4E, respectively. These slopes are typically seen in the infrasonic range and highlight the reduction of the signal amplitude at low frequencies and are indicative of an acoustic leak of the earbud seal. Reference 430A shows a much steeper slope for the leaky signals, and also shows that a rolloff occurs around 18 Hz (infrasonic). The corrected signals, in contrast, have greater signal amplitude (esp in the infrasonic range), a flatter slope 430B and no discernible rolloff.

Figure 5:
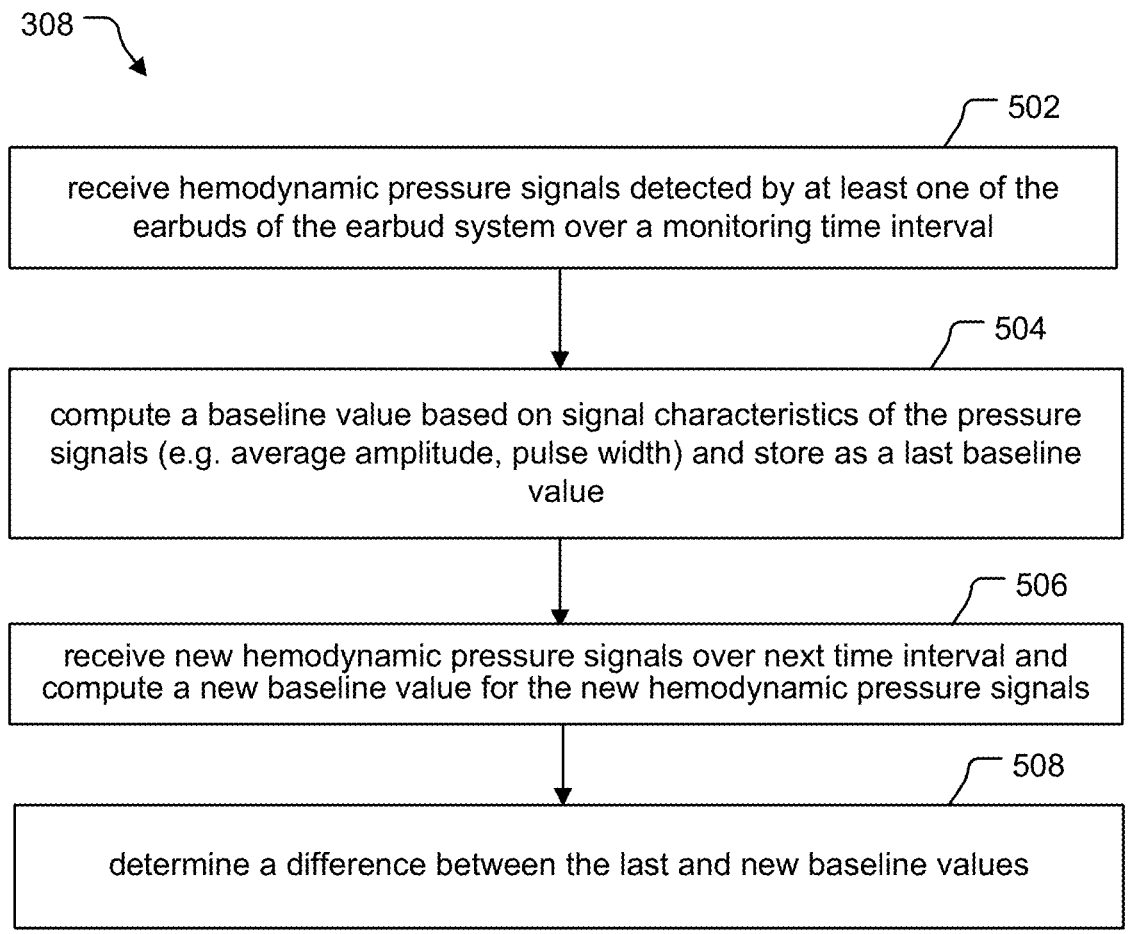
FIG. 5 is a flow chart that shows more detail for calculating changes in the signal characteristics of the hemodynamic pressure signals to identify leaks over time in the method of FIG. 3, according to an embodiment.

FIG. 5 describes one exemplary method of the data analysis system for determining changes to signal characteristics of the hemodynamic pressure signals 401 over time. This method provides more detail for FIG. 3 step 308.

In step 502, the data analysis system 209 receives hemodynamic pressure signals 401 detected by at least one of the earbuds 103 of the earbud system 102 over a monitoring time interval, such as a polling interval. According to step 504, the data analysis system 209 computes a baseline value based on signal characteristics of the pressure signals 401 (e.g., average amplitude, pulse width) and stores the baseline value as a last baseline value. In another example, a slope of the frequency spectrum of the hemodynamic pressure signals 401/transformed pressure signals 401' might also be used.

In step 506, the data analysis system 209 receives new pressure signals 401 over the next time interval and computes a new baseline value for the new hemodynamic pressure signals 401. The new baseline value is calculated using the same signal characteristics selected for the previous baseline value in step 504. Then in step 508, the data analysis system 209 calculates a difference between the previous and new baseline values.

Figure 6:
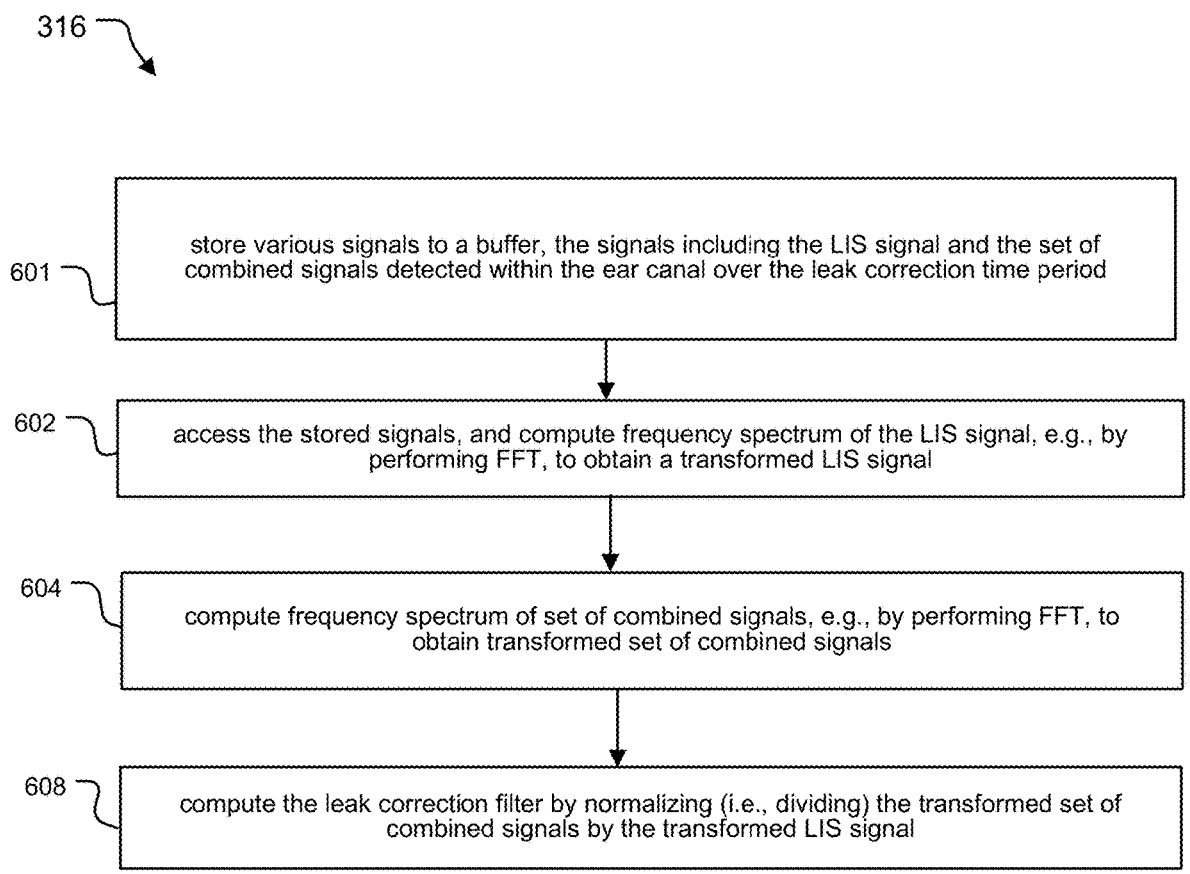
FIG. 6 is a flow chart that provides more detail for the method of FIG. 3, according to an embodiment, where the flow chart describes one implementation for creating a leak correction filter for correcting leaky pressure signals.

FIG. 6 is a flow chart of a method that provides more detail for the calculation of the leak correction filter in FIG. 3. Specifically, this method provides more detail for FIG. 3, step 316.

In step 601, the data analysis system 209 stores various signals to a buffer. These signals include the LIS signals introduced into the ear canal over the leak correction time period and the set of combined signals detected within the inner ear canal over the time period. When the LIS signal is an active LIS signal, the set of combined signals includes any hemodynamic pressure signals 401 in the ear canal, combined with the multiple LIS signals repeatedly presented by the speaker 278 into the ear canal under direction of the controller 284 or data analysis system 209, over the leak correction time period.

In step 602, the data analysis system 209 accesses the stored signals in the buffer, and computes a frequency spectrum of the stored LIS signal (e.g., by performing a FFT), to obtain a transformed LIS signal. In step 604, the data analysis system 209 computes a frequency spectrum of the set of combined signals to obtain a transformed set of combined signals.

Then in step 608, the controller computes the leak correction filter by extracting the transformed LIS signal from the transformed set of combined signals. Here, the data analysis system 209 generally accomplishes this by normalizing (e.g., dividing) the transformed set of combined signals by the transformed LIS signal. In another example, the data analysis system 209 might subtract the transformed LIS signal from the transformed set of combined signals, if the frequency spectrums are stored in units of decibels (dB). In still another example, the data analysis system 209 obtains an average frequency spectrum of the LIS signal that is averaged over several iterations of the set of combined signals, and then divides the transformed set of combined signals by the average frequency spectrum of the LIS signal.

The data analysis system 209 then typically performs additional signal processing steps upon the leak correction filter. These processing steps adjust for possible misalignment and/or phase shifts between the transformed LIS signal and the transformed set of combined signals, and for slight variations in signal amplitude between these signals over time.

FIG. 7A-7C illustrate operation of the method in FIG. 6.

FIG. 7A shows a plot of a logarithmic chirp 350 on the left, and its frequency spectrum 350' on the right. FIG. 7A shows more detail for step 602 of FIG. 3.

The chirp 350 is a typical example of an active LIS signal that can span a wide range of frequencies. The active LIS signal can be stored in system memory, and then accessed and introduced to the speaker(s) 278 as required. In the illustrated example, the data analysis system 209 obtains the frequency spectrum of the LIS signal 350 by performing a Fourier transform upon the LIS signal 350 to obtain a transformed LIS signal 350'. In one example, as shown, an FFT is used.

FIG. 7B shows a plot of a set of combined signals 360S on the left, and its frequency spectrum 360 S' on the right. FIG. 7B shows more detail for step 604 of FIG. 6.

The set of combined signals 360S includes multiple combined signals 360 obtained over the leak correction time period. In the illustrated example, the data analysis system 209 obtains the frequency spectrum of the set of combined signals 360S by performing a Fourier transform upon the set of combined signals 360S to obtain a transformed set of combined signals 360S'. In one example, as shown, an FFT is used.

FIG. 7C shows an exemplary leak correction filter 370' calculated in step 608 of FIG. 6. Here, the leak correction filter 370' is calculated by dividing the transformed set of combined signals 360S' in FIG. 7B by the transformed LIS signal 350' in FIG. 7A. The leak correction filter 370' is designed to improve the signal strength of frequency components of the transformed leaky pressure signals 401L', particularly in the infrasonic range.

FIG. 8A shows a plot of leaky pressure signal 401L on the left, and a plot of transformed leaky pressure signals 401L' on the right. The figure illustrates step 318 in the method of FIG. 3. In the illustrated example, the data analysis system 209 obtains the frequency spectrum of the leaky pressure signals 401L by performing a Fourier transform upon the leaky pressure signals 401L to obtain the transformed leaky pressure signals 401L'. In one example, as shown, an FFT is used.

FIG. 8B shows a plot of transformed corrected pressure signals 401C' on the left, and a plot of corrected pressure signals 401C on the right. The figure illustrates step 320 in the method of FIG. 3. In the illustrated example, the data analysis system 209 obtains the corrected pressure signals 401C by performing an inverse Fourier transform upon the transformed corrected pressure signals 401C'. The transformed corrected pressure signals 401C' can be obtained by applying the leak correction filter 370' to the transformed leaky pressure signals 401L' (e.g., by convolution). In one example, as shown, an inverse FFT (IFFT) is used.

In various figures described herein above, it can also be appreciated that the data analysis system 209 can use transformation functions other than Fourier analysis-based transforms/FFTs to convert time domain signals into their frequency spectra/transformed versions. In examples, wavelet analysis or Hartley transforms might be used.

Figure 9:
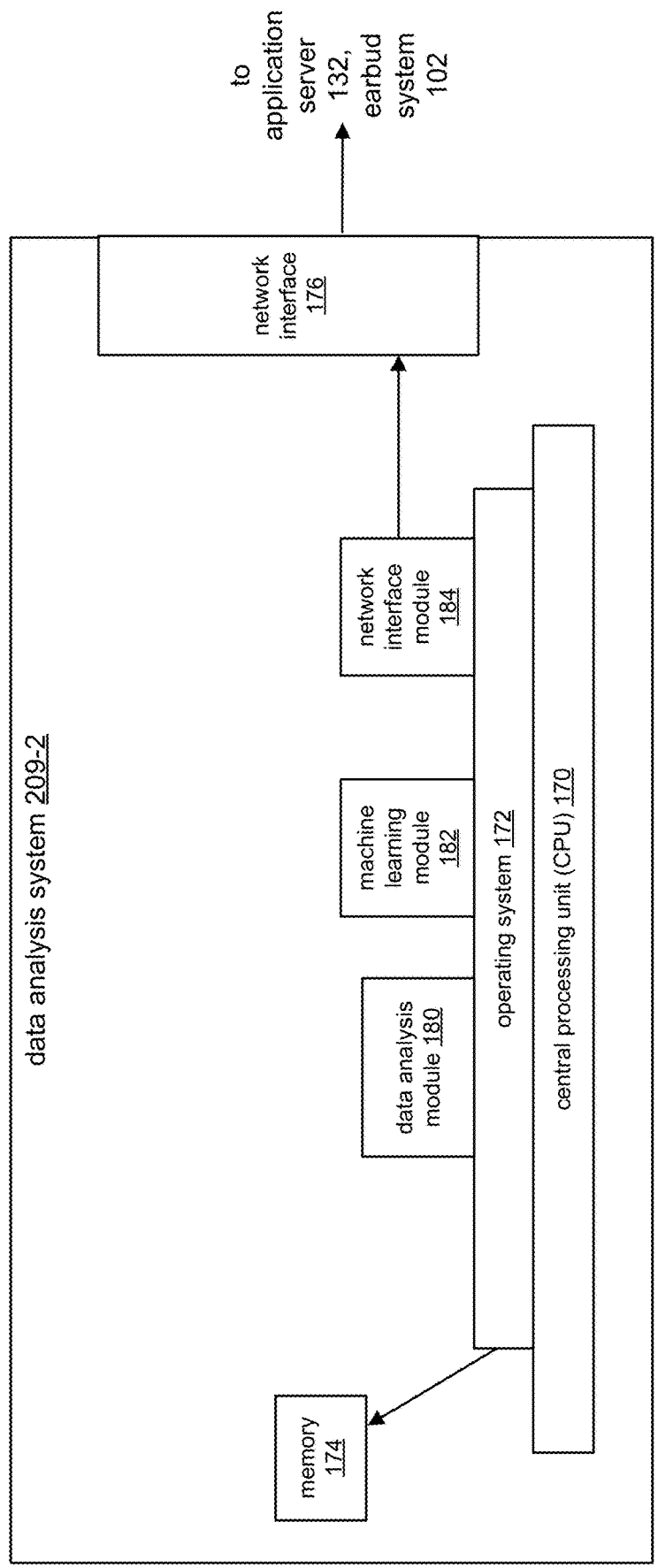
FIG. 9 is a block diagram showing detail for the data analysis system, according to an embodiment, where the data analysis system is included within a user device carried by the individual.

FIG. 9 shows detail for the data analysis system 209-2 of the user device 107-1 in FIGS. 1A and 1B. The data analysis system 209-2 includes a central processing unit (CPU) 170, an operating system 172, a memory 174, a network interface 176, and various software applications or modules. The software applications may include a data analysis module 180, a machine learning module 182, and a network interface module 184. The network interface module 184 communicates with the network interface 176. The network interface 176, in turn, provides connections to other components in the biosensor system 10. The operating system 172 loads the software applications into the memory 174 and schedules the applications for execution by the CPU 170.

Figure 10:
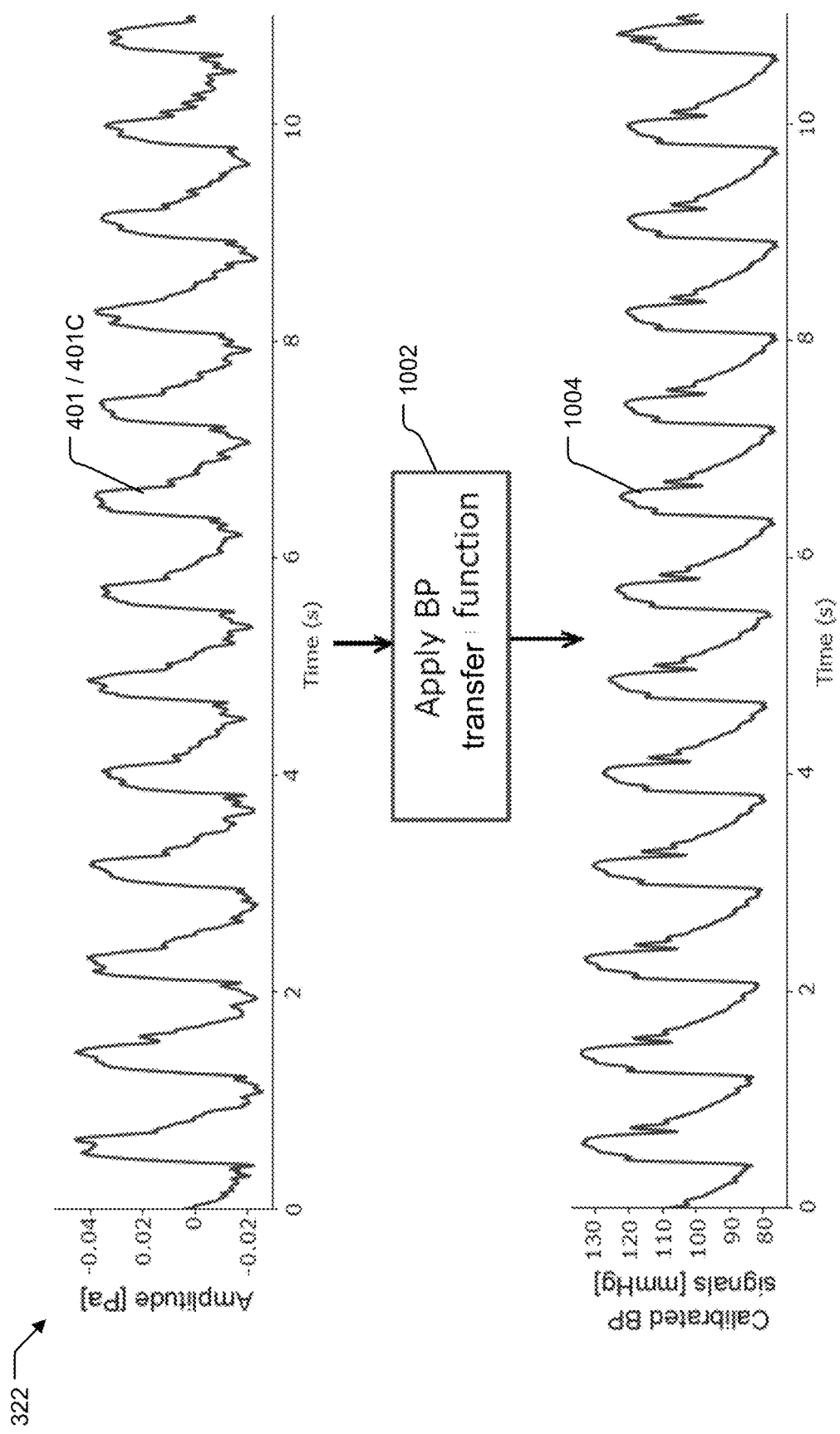
FIG. 10 is a schematic diagram that includes two exemplary plots, according to one embodiment, where the figure illustrates how the method of FIG. 3 calculates a calibrated bp signal of the individual using a bp transfer function.

FIG. 10 shows a plot of hemodynamic pressure signals 401/corrected pressure signals 401C on the top, and a plot of a calibrated hemodynamic signal 1004 on the bottom. The data analysis system 209 calculates the calibrated hemodynamic signal by applying a bp transfer function 1002 to the hemodynamic pressure signals 401/corrected pressure signals 401C. This figure illustrates some of the operations in step 324 of FIG. 3.

In another example, one or more machine learning modules 182 can be used to derive a learning algorithm based on template libraries of hemodynamic pressure signals stored in the data analysis system 209. Template libraries for training the machine learning model can be curated from simulations of cardiovascular systems of multiple individuals and/or catheter data from clinical trials, in examples.

While this invention has been particularly shown and described with references to preferred embodiments thereof, it will be understood by those skilled in the art that various changes in form and details may be made therein without departing from the scope of the invention encompassed by the appended claims.

What is claimed is:

1. A biosensor system, comprising:
   an acoustical assembly including an earbud system that is configured to form an earbud seal with an ear canal of an individual, wherein the earbud system includes an earbud with an in-ear acoustic sensor that detects acoustic signals from a body of the individual in the ear canal over time, and wherein the acoustic signals include audible signals and infrasonic signals;
   a data analysis system that receives the acoustic signals from the earbud system, identifies hemodynamic pressure signals included within the infrasonic signals, and identifies signal characteristics of the hemodynamic pressure signals over time; and
   a user device that includes a processor, a memory and at least one application that executes in the memory, wherein the user device is configured to be carried by the individual, and wherein the user device is in communication with the earbud system and the data analysis system;
   wherein the data analysis system detects leaky pressure signals, which are reduced amplitude versions of the hemodynamic pressure signals caused by leaks in the earbud seal, and computes corrected versions of the leaky pressure signals based upon changes to the signal characteristics of the hemodynamic pressure signals over time;

wherein the data analysis system is configured to:

compute hemodynamic measurements of the individual from at least the corrected versions of the leaky pressure signals, the hemodynamic measurements including blood pressure (bp) measurements;

include the hemodynamic measurements including the bp measurements in messages; and send the messages to the individual via the user device, which reports the hemodynamic measurements to the individual; and wherein the data analysis system additionally sends the messages including the hemodynamic measurements to a medical records database to update medical records of the individual.

2. The biosensor system of claim 1, wherein the signal characteristics include amplitudes of the hemodynamic pressure signals.

3. The biosensor system of claim 1, wherein the signal characteristics include pulse widths of the hemodynamic pressure signals.

4. The biosensor system of claim 1, wherein the data analysis system determines the changes to the signal characteristics of the hemodynamic pressure signals over time by determining whether a difference between signal characteristics of hemodynamic pressure signals for a current monitoring interval and signal characteristics of hemodynamic pressure signals for a previous monitoring interval exceeds a threshold value.

5. The biosensor system of claim 1, wherein the data analysis system, to compute the corrected versions of the leaky pressure signals:

introduces a leak identification stimulus (LIS) signal into the ear canal of the individual for a leak correction time period;

receives a set of combined signals from the earbud system, wherein the set of combined signals were detected in the ear canal by the earbud system over the leak correction time period, and wherein the set of combined signals includes the LIS signal detected over the leak correction time period and the leaky pressure signals detected over the leak correction time period;

computes a leak correction filter in the frequency domain, based upon the set of combined signals;

receives and records new leaky pressure signals detected in the ear canal by and sent from the earbuds;

performs a fourier transform upon the new leaky pressure signals to obtain transformed versions of the new leaky pressure signals;

multiplies the transformed versions of the new leaky pressure signals by the leak correction filter, to obtain a product of the transformed versions of the new leaky pressure signals and the leak correction filter; and performs an inverse fourier transform on the product.

6. The biosensor system of claim 5, wherein the LIS signal is an active LIS signal that the data analysis system selects from a memory and introduces into the ear canal via a speaker included within the earbud.

7. The biosensor system of claim 5, wherein the LIS signal is a passive LIS signal that the data analysis system derives from the acoustic signals.

8. The biosensor system of claim 5, wherein the LIS signal is an infrasonic signal.

9. The biosensor system of claim 1, wherein the data analysis system is included within the user device.

10. The biosensor system of claim 1, wherein the data analysis system is included within the earbud system.

11. The biosensor system of claim 1, wherein the data analysis system is included within a network that is remote to the acoustical assembly.

12. The system of claim 1, wherein the messages include information instructing the individual to seek medical attention.

13. The system of claim 1, wherein the data analysis system additionally sends the messages to at least one of medical facilities, health care professionals or first responders.

14. The system of claim 1, wherein when the data analysis system determines that an amplitude of the hemodynamic pressure signals is not above a threshold level, the data analysis system includes information in the messages instructing the individual to adjust a fit of the earbud.

15. The system of claim 1, wherein prior to computing the hemodynamic measurements from the corrected versions of the leaky pressure signals, the data analysis system calibrates the corrected versions of the leaky pressure signals using a reference blood pressure (bp) signal from a reference bp monitoring system.

* * * * *